(12) United States Patent
Olson et al.

(10) Patent No.: US 8,103,082 B2
(45) Date of Patent: *Jan. 24, 2012

(54) OPTIMIZING VIRTUAL SLIDE IMAGE QUALITY

(75) Inventors: Allen Olson, San Diego, CA (US); Dirk G. Soenksen, Carlsbad, CA (US); Kiran Saligrama, San Diego, CA (US)

(73) Assignee: Aperio Technologies, Inc., Vista, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/711,157

(22) Filed: Feb. 23, 2010

(65) Prior Publication Data

US 2010/0141753 A1 Jun. 10, 2010

Related U.S. Application Data

(63) Continuation of application No. 11/140,589, filed on May 26, 2005, now Pat. No. 7,668,362, which is a continuation-in-part of application No. 10/827,207, filed on Apr. 16, 2004, now Pat. No. 7,518,652, which is a continuation-in-part of application No. 10/798,457, filed on Mar. 11, 2004, now Pat. No. 6,917,696, which is a continuation of application No. 09/563,437, filed on May 3, 2000, now Pat. No. 6,711,283.

(60) Provisional application No. 60/575,047, filed on May 27, 2004.

(51) Int. Cl.
*G06K 9/00* (2006.01)
*G06K 9/40* (2006.01)

(52) U.S. Cl. .......... 382/133; 382/128; 382/255
(58) Field of Classification Search .......... 382/133, 382/128, 255

See application file for complete search history.

(56) References Cited

U.S. PATENT DOCUMENTS

| 3,643,015 A | 2/1972 | Davidovits et al. |
| 4,673,988 A | 6/1987 | Jansson et al. |

(Continued)

FOREIGN PATENT DOCUMENTS

CA 2229175 8/1999

(Continued)

OTHER PUBLICATIONS

Hoppe, H. et al.: "Surface Reconstruction From Unorganized Points", Computer Graphics, vol. 26, No. 2, Jul. 1, 1992.

(Continued)

*Primary Examiner* — Bernard Krasnic
(74) *Attorney, Agent, or Firm* — Pattric J. Rawlins; Procopio Cory Hargreaves & Savitch LLP

(57) ABSTRACT

Systems and methods for assessing and optimizing virtual microscope slide image quality are provided. In order to determine whether a virtual slide image has any out of focus areas and is therefore a candidate for manual inspection, the various focus points used to scan the virtual slide image are used to calculate a best fit surface for the virtual slide image. The distance of each focus point from the best fit surface is then calculated and the largest distance is compared to a predetermined value. If the largest distance from a focus point to the best fit surface is larger than the predetermined value, then the virtual slide image is designated as needing a manual inspection and possible re-scan.

10 Claims, 7 Drawing Sheets

U.S. PATENT DOCUMENTS

| | | | |
|---|---|---|---|
| 4,700,298 A | 10/1987 | Palcic et al. | |
| 4,742,558 A | 5/1988 | Ishibashi et al. | |
| 4,744,642 A | 5/1988 | Yoshinaga et al. | |
| 4,760,385 A | 7/1988 | Jansson et al. | |
| 4,777,525 A | 10/1988 | Preston, Jr. | |
| 4,806,015 A | 2/1989 | Cottingham | |
| 4,845,552 A | 7/1989 | Jaggi et al. | |
| 4,960,999 A | 10/1990 | McKean et al. | |
| 5,086,477 A | 2/1992 | Yu et al. | |
| 5,130,651 A * | 7/1992 | Morrey, Jr. | 324/225 |
| 5,146,510 A | 9/1992 | Cox et al. | |
| 5,187,754 A | 2/1993 | Currin et al. | |
| 5,231,663 A | 7/1993 | Earl et al. | |
| 5,400,145 A | 3/1995 | Suita et al. | |
| 5,412,214 A | 5/1995 | Suzuki et al. | |
| 5,495,535 A | 2/1996 | Smilansky et al. | |
| 5,578,832 A | 11/1996 | Trulson et al. | |
| 5,633,948 A | 5/1997 | Kegelmeyer, Jr. | |
| 5,644,356 A | 7/1997 | Swinson et al. | |
| 5,672,861 A | 9/1997 | Fairley et al. | |
| 5,710,835 A | 1/1998 | Bradley | |
| 5,714,756 A | 2/1998 | Park et al. | |
| 5,790,710 A | 8/1998 | Price et al. | |
| 5,793,969 A | 8/1998 | Kamentsky et al. | |
| 5,796,861 A | 8/1998 | Vogt et al. | |
| 5,834,758 A | 11/1998 | Trulson et al. | |
| 5,872,591 A | 2/1999 | Truc et al. | |
| 5,904,652 A | 5/1999 | Gilbert et al. | |
| 5,912,699 A | 6/1999 | Hayenga et al. | |
| 5,922,282 A | 7/1999 | Ledley | |
| 5,943,122 A | 8/1999 | Holmes | |
| 5,963,314 A | 10/1999 | Worster et al. | |
| 5,968,731 A | 10/1999 | Layne et al. | |
| 5,991,444 A | 11/1999 | Burt et al. | |
| 5,999,662 A | 12/1999 | Burt et al. | |
| 6,002,789 A | 12/1999 | Olsztyn et al. | |
| 6,005,964 A | 12/1999 | Reid et al. | |
| 6,049,421 A | 4/2000 | Raz et al. | |
| 6,078,681 A | 6/2000 | Silver | |
| 6,091,846 A | 7/2000 | Lin et al. | |
| 6,101,265 A | 8/2000 | Bacus et al. | |
| 6,215,892 B1 | 4/2001 | Douglass et al. | |
| 6,262,838 B1 | 7/2001 | Montagu | |
| 6,272,235 B1 | 8/2001 | Bacus et al. | |
| 6,288,782 B1 | 9/2001 | Worster et al. | |
| 6,327,377 B1 | 12/2001 | Rutenberg et al. | |
| 6,330,348 B1 | 12/2001 | Kerschmann et al. | |
| 6,341,179 B1 | 1/2002 | Stoyle et al. | |
| 6,438,268 B1 | 8/2002 | Cockshott et al. | |
| 6,519,357 B2 | 2/2003 | Takeuchi | |
| 6,711,283 B1 | 3/2004 | Soenksen | |
| 6,714,281 B1 | 3/2004 | Amano et al. | |
| 6,763,140 B1 | 7/2004 | Skoll | |
| 6,922,479 B2 | 7/2005 | Berliner | |
| 7,155,049 B2 | 12/2006 | Wetzel et al. | |
| 7,247,825 B2 | 7/2007 | Soenksen et al. | |
| 7,312,919 B2 | 12/2007 | Overbeck | |
| 7,668,362 B2 * | 2/2010 | Olson et al. | 382/133 |
| 2002/0090127 A1 | 7/2002 | Wetzel et al. | |
| 2007/0031056 A1 * | 2/2007 | Perz | 382/255 |

FOREIGN PATENT DOCUMENTS

| | | |
|---|---|---|
| DE | 10232242 | 2/2004 |
| EP | 0 339 582 | 4/1989 |
| EP | 0 871 052 | 10/1998 |
| JP | 2001210263 | 8/2001 |
| JP | 2002042706 | 2/2002 |
| WO | WO 98/39728 | 9/1998 |
| WO | WO 98/44446 | 10/1998 |
| WO | WO 0184209 | 11/2001 |

OTHER PUBLICATIONS

Wang et al.: "Robust Fitting by Adaptive-Scale Residual Consensus", Apr. 22, 2004, Computer Vision—ECCV 2004, Springer-Verlag, Berlin/Heidelberg, pp. 107-118.

Glatz-Krieger et al. "Virtual Slides: High-Quality Demand, Physical Limitations, and Affordability", Human Pathology, vol. 34, No. 10, Oct. 2003, pp. 968-974.

European Search Report for corresponding European Application No. 05760517.2 dated May 28, 2010.

Hamilton, Eric, "JPEG File Interchange Format" Version 1.02, Sep. 1, 1992; C-Cube Microsystem, Milpitas, CA.

Adobe Developers Association, "TIFF" Revision 6.0, Jun. 3, 1992; Adobe Systems Incorporated, Mountain View, CA.

European Patent Office supplementary search report, European Patent Application No. 04750306.5- 2217, issued Sep. 11, 2008.

* cited by examiner

OPTIMIZING VIRTUAL SLIDE IMAGE QUALITY

RELATED APPLICATION

The present application is a continuation of U.S. patent application Ser. No. 11/140,589 filed on 26 May 2005, which claims the benefit of U.S. provisional patent application Ser. No. 60/575,047 filed on 27 May 2004 and which is a continuation-in-part of U.S. patent application Ser. No. 10/827,207 filed on 16 Apr. 2004, and which is a continuation-in-part of U.S. patent application Ser. No. 10/798,457 filed on 11 Mar. 2004, which is a continuation of U.S. patent application Ser. No. 09/563,437, now U.S. Pat. No. 6,711,283. Each of the aforementioned applications is incorporated herein by reference in its entirety.

BACKGROUND

1. Field of the Invention

The present invention relates to the field of virtual microscopy and more particularly relates to the assessment of image quality based upon the focus map of a line scan camera prior to and during the capture of imagery data from a specimen on a microscope slide.

2. Related Art

In conventional virtual microscopy systems, image tiling techniques produce individual image tiles that can be significantly out of focus over much of the image. An image tiling system is restricted to a single focus height for each individual snapshot taken by its camera, thus, each of these "fields of view" have areas that are out of focus when the subject specimen being scanned does not have a uniform surface. At the high magnification levels employed in virtual microscopy, specimens with a uniform surface are extremely rare. Moreover, conventional image tiling systems suffer from circular optical distortion that is inherent in the use of an area scan camera with an objective lens. This circular distortion causes the perimeter area of an image tile to be out of focus.

Conventional image tiling solutions are severely handicapped by these limitations, with their only recourse for the inherent circular optical distortion being to discard a significant amount of out of focus image data on the perimeter of each image tile. This results in an increased number of image tiles that must be scanned and a corresponding increase in the time to scan a microscope slide. Furthermore, even when the out of focus perimeter image data is discarded, the remaining image data still suffers from out of focus areas on each image tile due to the lack of a uniform surface and also from circular optical distortion.

Recently, new line scan camera systems have been introduced to the virtual microscopy industry such as the ScanScope® scanner created by Aperio Technologies, Inc. The revolutionary ScanScope® scanner system does not suffer from circular optical distortion due to its use of a line scan camera. Additionally, the line scan camera can adjust its focus for each line of pixels that are captured when scanning a microscope slide and can therefore track a non-uniform surface. Thus, the quality of the resulting image from a line scan camera system is inherently superior due to the sharp focus of each line of pixels captured by the line scan camera.

Although the imagery data captured by a line scan camera is objectively better, there are still focus problems that may arise during image capture. For example, pre-scan focus procedures that identify focus points may focus on non-tissue material, such as dirt, scratches, pen marks, labels, or other debris. This foreign material often resides on the top of the cover slip or the bottom surface of the slide. In these cases the distance between the measured pre-scan focus point and the optimal focus height may be quite large. Accordingly, any tissue that is in the neighborhood of these pre-scan focus points can be dramatically out of focus.

Additionally, when a tissue specimen does not lay flat on the glass (often referred to as having "folded" tissue) the field of view ("FOV") of the objective lens cannot be brought into focus using a single focus height. In this case, it is important that the pre-scan focus points be focused on the non-folded parts of the tissue, which is increasingly unlikely as the amount of folded tissue increases.

Also, in some cases the tissue specimen does not have sufficient contrast to allow the pre-scan focus procedure to make an accurate measurement. In such a case, the pre-scan focus procedure may focus on other material as previously described. Fortunately, the likelihood of this happening can be greatly reduced by setting a contrast threshold that rejects focus points identified by the pre-scan focus procedure that have insufficient contrast. Finally, a microscope slide may not be held securely during the scanning process. If this occurs, the height of the slide will likely change during the scanning process, after which the focus points identified in the pre-scan focus procedure will no longer be valid.

If any of these conditions occurs, some part of the resulting virtual slide image will be out of focus. However, identifying virtual slide images with out of focus areas requires a manual inspection of each virtual slide image. This is a very costly and time consuming quality control problem. And when out of focus virtual slide images are detected, an operator must use a manual procedure to re-scan the virtual slide image, which is also time consuming. During the manual procedure, the operator will identify known good tissue locations on the slide that are used for focus point placement. After this, the operator will either manually focus the points prior to scanning, or allow the system to proceed automatically using the good focus point locations.

Accordingly, the advancements in the virtual microscopy industry have created a need for improved systems and methods for assessing and optimizing virtual slide image quality that overcome the costly and time consuming manual inspection process and capitalizes on the focusing capabilities and speed of the revolutionary line scan camera systems.

SUMMARY

Accordingly, systems and methods for optimizing virtual slide image quality are described that assess the quality of a virtual microscope slide image and identify those virtual slide images that are highly likely to have out of focus portions and need to be re-scanned. Initially, a set of focus points are identified that were used in the scan of a virtual slide image. These focus points are used to determine a best fit surface for the virtual slide image. The largest distance of any focus point from the best fit surface is then identified and compared to a predetermined maximum distance value. If the largest distance is greater than the maximum distance, then the virtual slide image is designated as needing a manual inspection.

Alternatively, the assessment can be done in real time during the scanning process. This allows focus points that have a distance from the best fit surface that exceeds the predetermined maximum value to be identified and discarded or recalibrated prior to the image capture process in order to increase the likelihood that all of the imagery data captured during the scanning of a virtual microscope slide image is in sharp focus and also to increase the likelihood that time consuming re-scans will be unnecessary.

Furthermore, when a set of slides are automatically scanned in succession, a resulting graphical display can be presented that identifies the slides in a fashion that easily demonstrates to an operator the virtual slide images that need manual inspection. This also identifies for the operator the physical microscope slides that may need to be re-scanned. The graphical display may also provide the operator with easy access to viewing a designated virtual slide image so that the manual inspection process is streamlined. The graphical display may also provide the operator with easy access to a re-scan mode so that the re-scanning process is also streamlined.

BRIEF DESCRIPTION OF THE DRAWINGS

The details of the present invention, both as to its structure and operation, may be gleaned in part by study of the accompanying drawings, in which like reference numerals refer to like parts, and in which:

FIG. 8 is a block diagram illustrating an exemplary computer system as may be used in

DETAILED DESCRIPTION

Certain embodiments as disclosed herein provide for systems and methods for assessing virtual microscope slide image quality to determine whether a virtual slide image has any out of focus areas and is therefore a candidate for manual inspection. For example, one method as disclosed herein allows for the various focus points used to scan the virtual slide image to be used in calculating a best fit surface for the virtual slide image. The distance of each focus point from the best fit surface is then calculated and the largest distance is compared to a predetermined value. If the largest distance from a focus point to the best fit surface is larger than the predetermined value, then the virtual slide image is designated as needing a manual inspection and possible re-scan.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Figure 1:
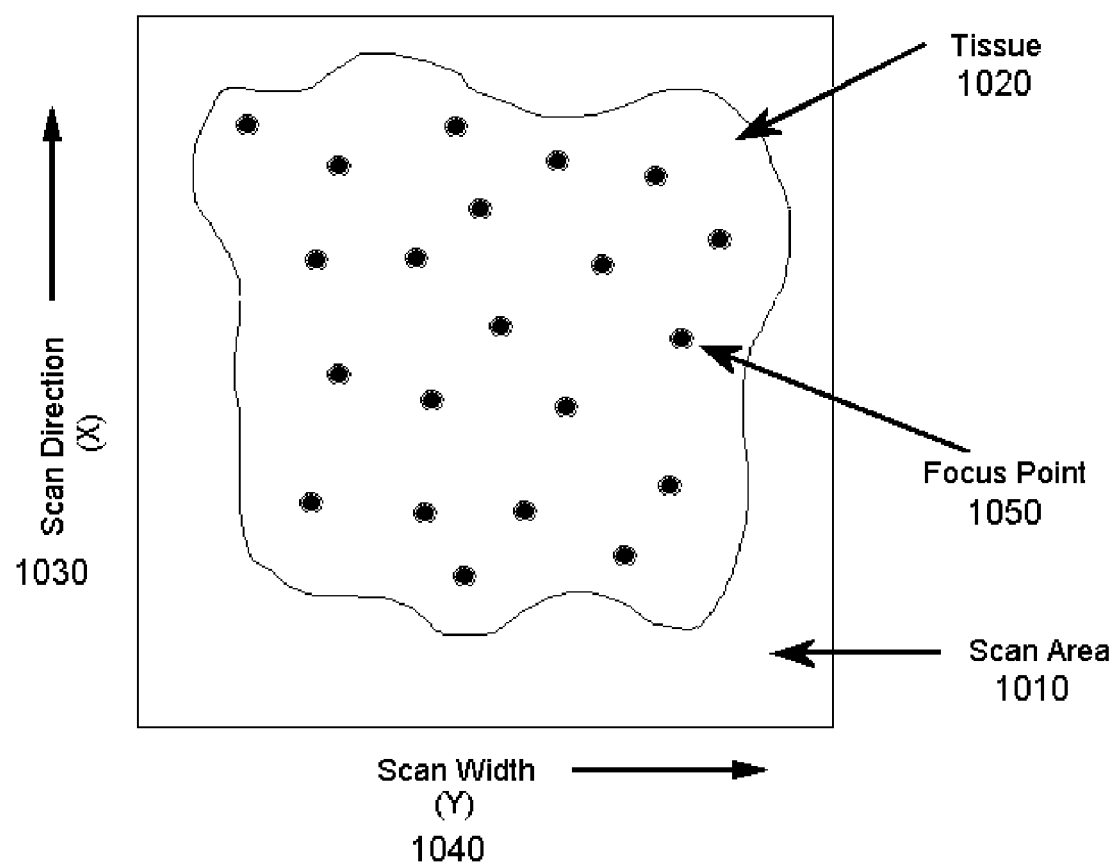
FIG. 1 is a block diagram illustrating an example plan view of a microscope slide according to an embodiment of the present invention.

FIG. 1 is a block diagram illustrating an example plan view of a microscope slide according to an embodiment of the present invention. In the illustrated embodiment, the scan area 1010 is a rectangular area that is somewhat larger than the tissue sample 1020 on the slide. Using a line scan camera, the area is scanned sequentially in stripes, as described in the aforementioned U.S. patent application Ser. Nos. 10/798,457 and 10/827,207. A Cartesian coordinate system can be used to describe the scanning process, in which the scan direction 1030 is assigned to the X coordinate and the scan width 1040 is assigned to the Y coordinate.

In one embodiment, during a pre-scan focus procedure, various focus points 1050 are selected on the slide, either manually or by some automatic procedure. These focus points are visited prior to the scan in order to identify the optimum focus height at the location. These optimum focus heights are used to assist in focusing the microscope objective lens during the scanning process. In the illustrated embodiment, each focus point [1050] has a location (X, Y) on the slide.

Figure 2:
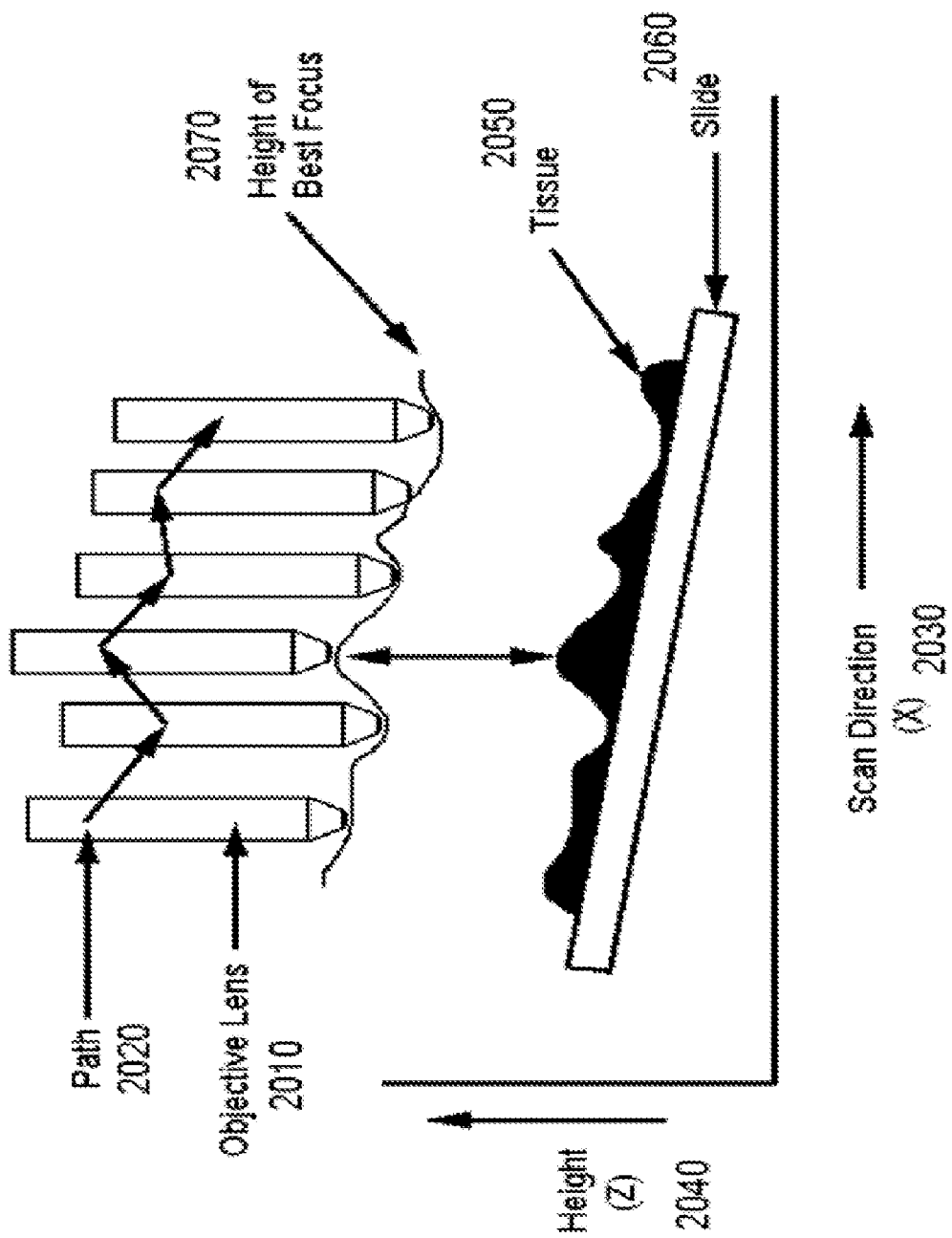
FIG. 2 is a block diagram illustrating an example side view of a microscope slide and the objective lens path when scanning the slide according to an embodiment of the present invention.

FIG. 2 is a block diagram illustrating an example side view of a microscope slide and the objective lens path when scanning the slide according to an embodiment of the present invention. In the illustrated embodiment, the objective lens 2010 is shown moving along a path 2020 in the scan direction 2030 assigned to the X coordinate. This may be accomplished by holding the slide 2060 stationary and moving the objective lens 2010 or conversely by holding the objective lens 2010 stationary and moving the slide 2060. In either case, the relative motion and path of the lens with respect to the slide is the same. During the scan, the height 2040 of the objective lens (assigned to the Z coordinate) is adjusted to keep the tissue 2050 in focus during the scanning process.

The procedure for determining the height of best focus 2070 (described in more detail in the aforementioned patent application Ser. No. 10/827,207) involves first positioning the objective lens above each focus point 1050 and then determining the height 2040 on the Z axis that provides the best focus for that location on the slide. From this set of points, a focal surface is determined and the objective follows this focal surface during the scanning process. The scanning system performs the focusing automatically and in one embodiment the points are refocused at regular intervals in order to account for system drift.

As illustrated in FIG. 2, the tissue 2050 is not perfectly flat and the slide 2060 is tilted with respect to the X and Z axes. Tissue specimens on microscope slides are normally thin (5 microns) and the glass slides to which they are mounted are very flat. In addition, high magnification objective lenses (e.g., 20×) have a narrow depth of field (typically less than 5 microns). It is common for a perfectly prepared slide on a good scanner to have 10 to 50 microns of tilt over the entire scan area (typically a 25 mm by 75 mm total area), with variations in focal height of 5 microns from the plane of the slide. It is to be expected then that a focal surface that follows the tissue specimen in this situation will be substantially planar, within a small range of deviation that accounts for variations in tissue thickness and height. Focus points that have height values that exceed this expected range indicate that it is likely that the tissue will be out of focus in that area of the scanned image. Advantageously, identification of these aberrant focus values ("outliers") provides a means for identifying virtual slide images with suspect image quality that can be manually inspected and re-scanned if necessary.

A pre-scan focus value (also referred to herein as a pre-focus value or a focus value) is determined by the three Cartesian coordinates (X, Y, Z). Each focus point has a focus value. The scan direction 1030 value (X coordinate) and the scan width 1040 value (Y coordinate) specify a point on the slide and the height 2040 value (Z coordinate) specifies the height of the objective lens above this location that brings the tissue into optimum focus. Together, the X, Y, and Z coordinates establish a pre-focus value. Alternative procedures for determining these coordinates are discussed in more detail in the aforementioned patent application Ser. No. 10/827,207. In general, there are N such focus points, where N can be any positive number, but for practical purposes it is most often in the range between 1 and 100.

Figure 3:
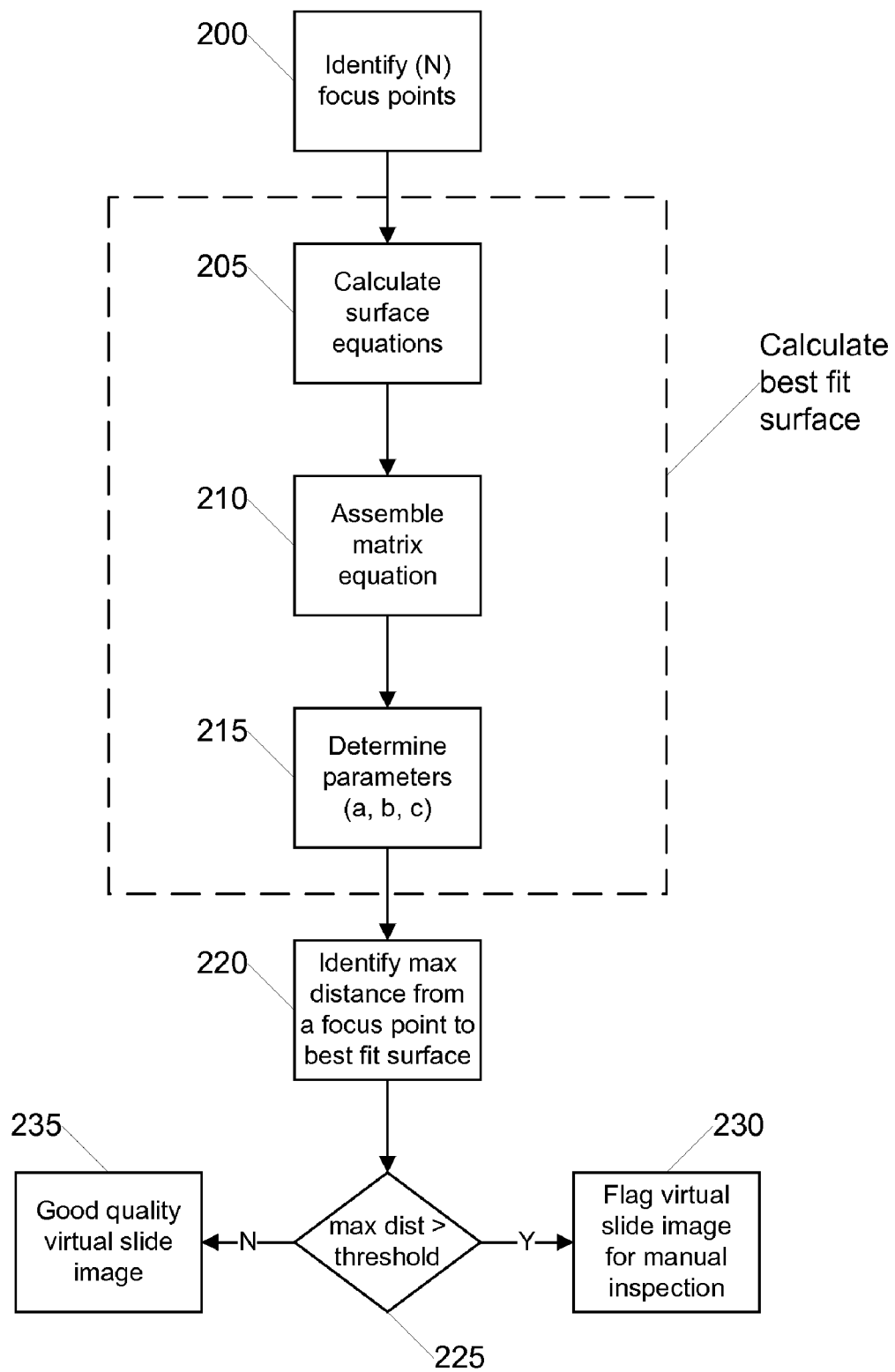
FIG. 3 is a flow diagram illustrating an example process for calculating a best fit surface and identifying aberrant focus points according to an embodiment of the present invention.

FIG. 3 is a flow diagram illustrating an example process for calculating a best fit surface and identifying aberrant focus points according to an embodiment of the present invention. Initially, in step 200, the N focus points are identified, with each focus point having a focus value. In an embodiment where the virtual slide image assessment takes place after the scanning process is complete, the focus points may be retrieved from a data storage area, for example, or otherwise obtained from memory or recalculated. In an embodiment where the virtual slide image assessment takes place in real time (during scanning), the focus points may be retrieved from a location in memory or retrieved from file storage or otherwise obtained.

In the illustrated embodiment, the best fit surface is calculated in steps 205, 210, and 215. The best fit surface does not necessarily coincide with the previously mentioned focal surface. Rather, the best fit surface is a substantially planar surface that represents an average of the various focus points over the scanned area (or area to be scanned in a real time embodiment). In one embodiment, a least-squares method can be used to calculate the best fit surface from the various focus points. In other embodiments, other methods can be used to calculate the best fit surface.

In a simple embodiment where the best fit surface is a plane, the best fit surface may be specified by the three parameters (a, b, c). Thus, all points (X, Y, Z) that lie on the best fit surface satisfy the surface equation:

$$a+bX+cY=Z$$

In step 205, the surface equation is applied to each focus value. The various focus values can be numbered from 1 to N, with the i'th value designated as $(X_i, Y_i, Z_i)$. This set of equations comprises a matrix equation that is assembled in step 210. Mathematically, the matrix equation may be written as:

$$\begin{pmatrix} 1 & X_1 & Y_1 \\ 1 & X_2 & Y_2 \\ 1 & X_3 & Y_3 \\ \cdots & \cdots & \cdots \\ 1 & X_N & Y_N \end{pmatrix} \begin{pmatrix} a \\ b \\ c \end{pmatrix} = \begin{pmatrix} Z_1 \\ Z_2 \\ Z_3 \\ \cdots \\ Z_3 \end{pmatrix}$$

The ellipses in the matrix equation indicate a repeating pattern in the matrix representation. If N=3, then the matrix is a 3-by-3, which can be solved exactly, due to the fact that three points uniquely determine a plane. In practice, N is much greater than 3. In step 215, the parameters (a, b, c) are determined, for example, by using standard least-squares methods. These parameters allow for the final calculation of the best fit surface for the matrix equation. A variety of known techniques exist for finding the least squares solution, including Gaussian elimination or one of its derivatives, such as Cholesky factorization. Alternatively, the least squares solution can be calculated directly using Singular Value Decomposition with generalized inverse. These methods of solution are well known to anyone skilled in the art of matrix linear algebra.

In other embodiments, best fit surfaces other than a plane may be used. For example, a parabolic surface would be advantageous if the glass slide were not flat, but instead had some amount of curvature or bending. Using a polynomial representation, the equation for a parabolic surface can be written as:

$$a+bX+cY+dXX+eYY+fXY=Z$$

In this equation, there are six parameters (a, b, c, d, e, f). Accordingly, the corresponding matrix equation would have six columns, and would be written as:

$$\begin{pmatrix} 1 & X_1 & Y_1 & X_1X_1 & Y_1Y_1 & X_1Y_1 \\ 1 & X_2 & Y_2 & X_2X_2 & Y_2Y_2 & X_2Y_2 \\ 1 & X_3 & Y_3 & X_3X_3 & Y_3Y_3 & X_3Y_3 \\ \cdots & \cdots & \cdots & \cdots & \cdots & \cdots \\ 1 & X_N & Y_N & X_NX_N & Y_NY_N & X_NY_N \end{pmatrix} \begin{pmatrix} a \\ b \\ c \\ d \\ e \\ f \end{pmatrix} = \begin{pmatrix} Z_1 \\ Z_2 \\ Z_3 \\ \cdots \\ Z_3 \end{pmatrix}$$

The matrix formulation can be extended to any arbitrary surface, with the result that the matrix equation will have the number of parameters and columns necessary to describe the surface. Once the matrix equation is generated in this fashion, the parameters are found using the same least-squares solution method, independent of the complexity of the surface. Those having skill in the art will understand how the matrix formulation can be applied to surfaces that are more complex than a plane or parabola.

In step 220 the distance of each focus point from the best fit surface is calculated by subtracting the best fit surface Z value from the focus point Z value $(Z_i)$ using the equation:

$$D_i = Z_i - a - bX_i - cY_i$$

With any tilt of the best fit surface removed, the adjusted Z values for each focus point will be clustered within a small range around zero. The value of the largest distance of any of the focus points from the best fit surface is then identified. This largest distance value is referred to as Dmax.

Next, the Dmax value is compared to a predetermined threshold to see if the Dmax value exceeds the threshold. If Dmax exceeds the threshold, as determined in step 225, then an outlier has been detected and the virtual slide image is flagged in step 230 as having suspect image quality and needing manual inspection. If Dmax is less than the threshold value, as determined in step 225, then no outlier is detected and the virtual slide image is classified as having good image quality, as shown in step 235. In one embodiment, a reasonable value for the threshold is 5 microns, however, the threshold can be set to any value, for example to optimize the identification of virtual slide images with poor image quality. For example, in an alternative embodiment the value of the threshold can be set to 10 microns.

Figure 4:
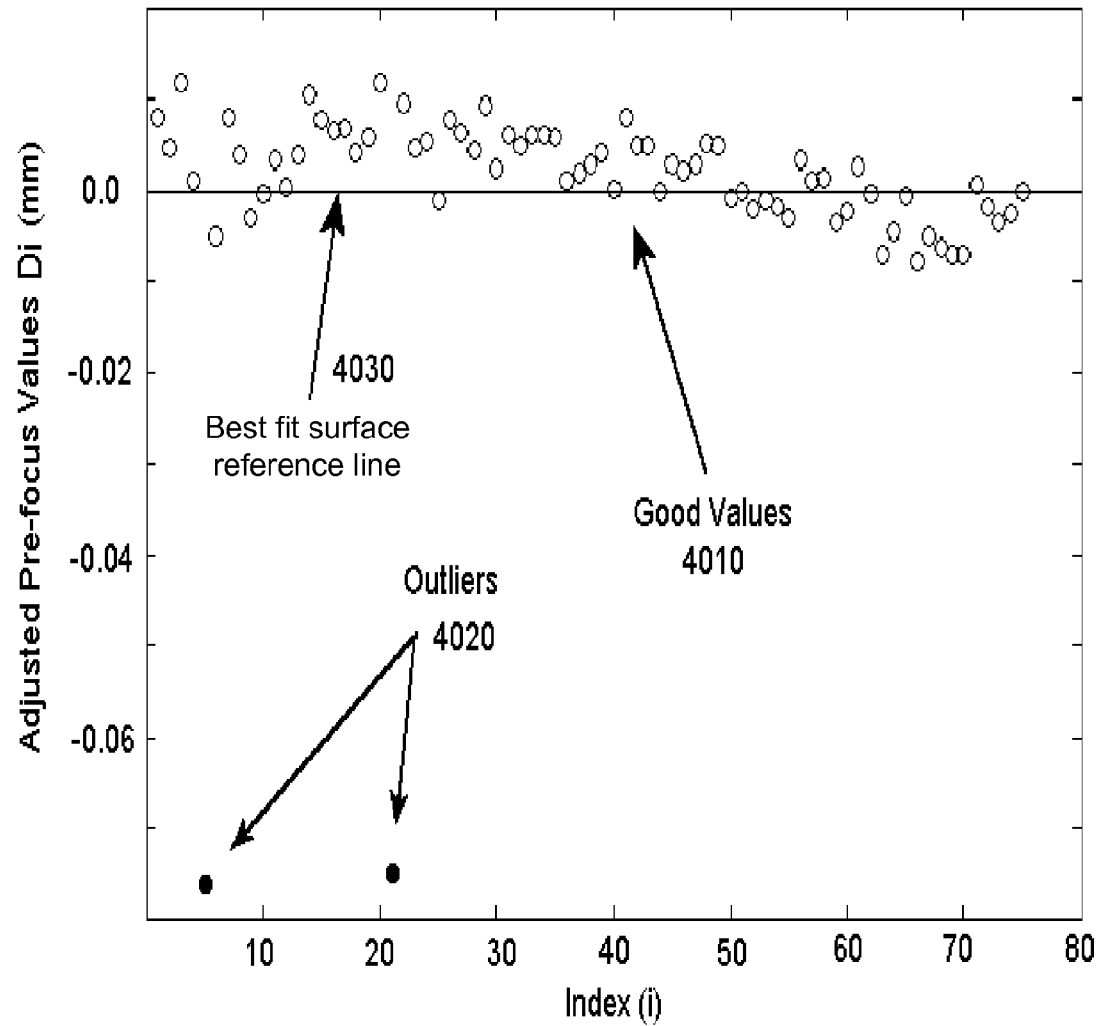
FIG. 4 is a graph diagram illustrating an example set of focus points and a best fit surface reference line according to an embodiment of the present invention.

FIG. 4 is a graph diagram illustrating an example set of focus points and a best fit surface reference line according to an embodiment of the present invention. In the illustrated embodiment, the adjusted focus values 4010 and 4020 for the various focus points of a virtual slide image having poor focus quality are shown on a graph. A total of 74 focus points are shown for the virtual slide image. Good focus values are shown as open circles 4010. The outlier focus values are easily identified at the bottom of the graph and are shown as black circles 4020. Focus points having an adjusted focus value of 0.0 lie exactly on the best fit surface reference line 4030. As can be seen in the illustrated graph, that the focus points with good focus values are clustered very close to the reference line and the outliers are far away from the reference line. Advantageously, any outlier values can be easily identified and this particular virtual slide image would be classified as suspect and would need manual inspection to determine whether it needed to be re-scanned due to poor image quality.

Figure 5:
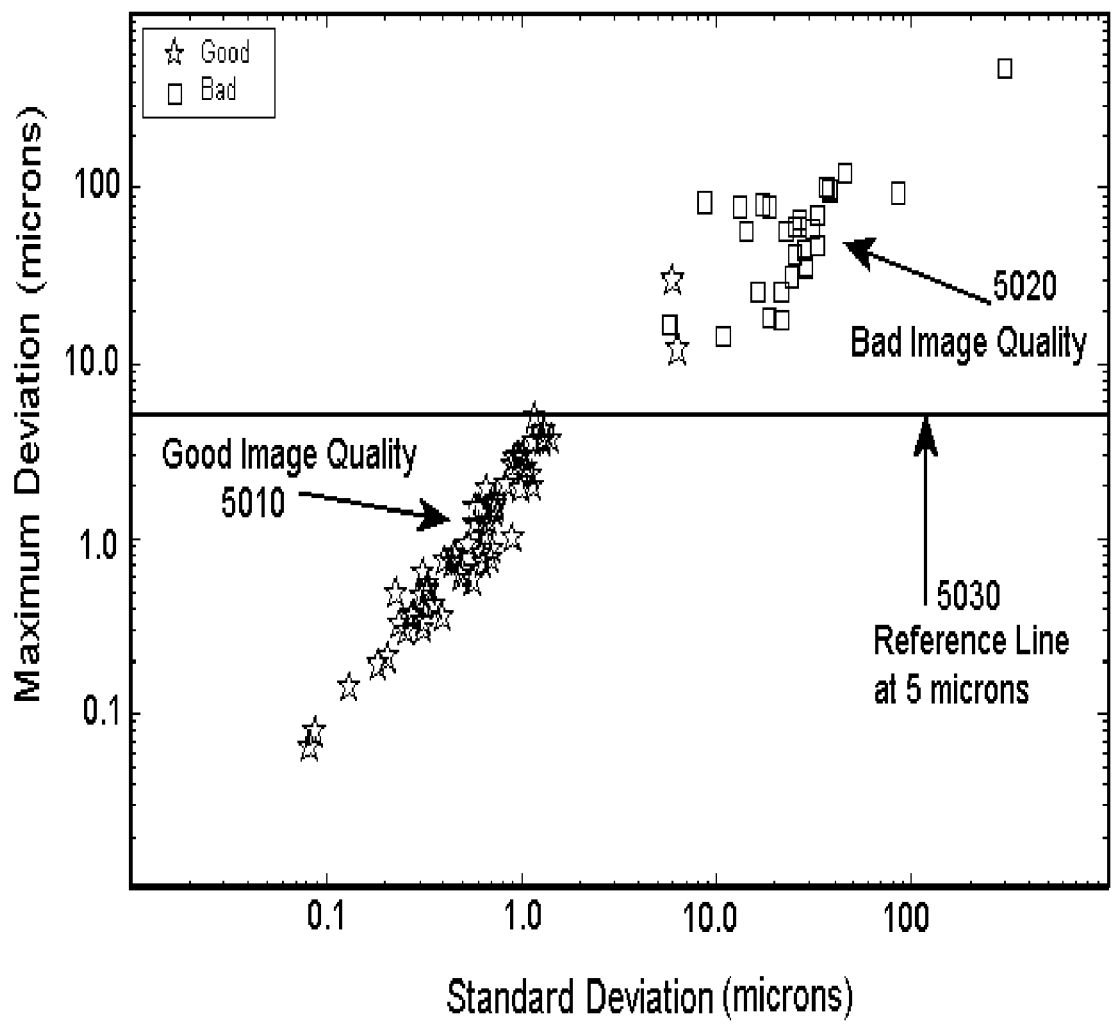
FIG. 5 is a graph diagram illustrating an example set of experimental data for assessed image quality of virtual slides according to an embodiment of the present invention.

FIG. 5 is a graph diagram illustrating an example set of experimental data for assessed image quality of virtual slides according to an embodiment of the present invention. As previously discussed, in one embodiment the threshold value may be 5 microns. Advantageously, the threshold value can be empirically determined and validated. This was done with a set of 89 virtual slide images and the results are shown in FIG. 5. In the illustrated example, each image was visually inspected and classified as good or bad. The maximum adjusted Z value (Dmax) was then found for each image using the outlier detection procedure. The statistics of the adjusted Z values for each image were also examined to determine the standard deviation of the distribution, though this was not essential for determining the threshold.

In the illustrated example, the good images 5010 are shown as star symbols and the bad images 5020 as shown as squares. A reference line 5030 is shown at 5 microns and clearly separates the bad images from the good images. Accordingly, by setting the threshold at 5 microns, the outlier detection procedure did not miss a single bad quality image—a sensitivity of 1.0. More importantly, 28 of the 30 images that exceed the threshold are in fact bad—a specificity of 28/30=0.93. Thus, only two good images were identified as needing a manual inspection. This means that operators of the scanner can confidently use the outlier detection procedure to identify suspect images and restrict manual inspection to just those images. This greatly reduces the number of images that need to be inspected for good focus quality.

Figure 6:
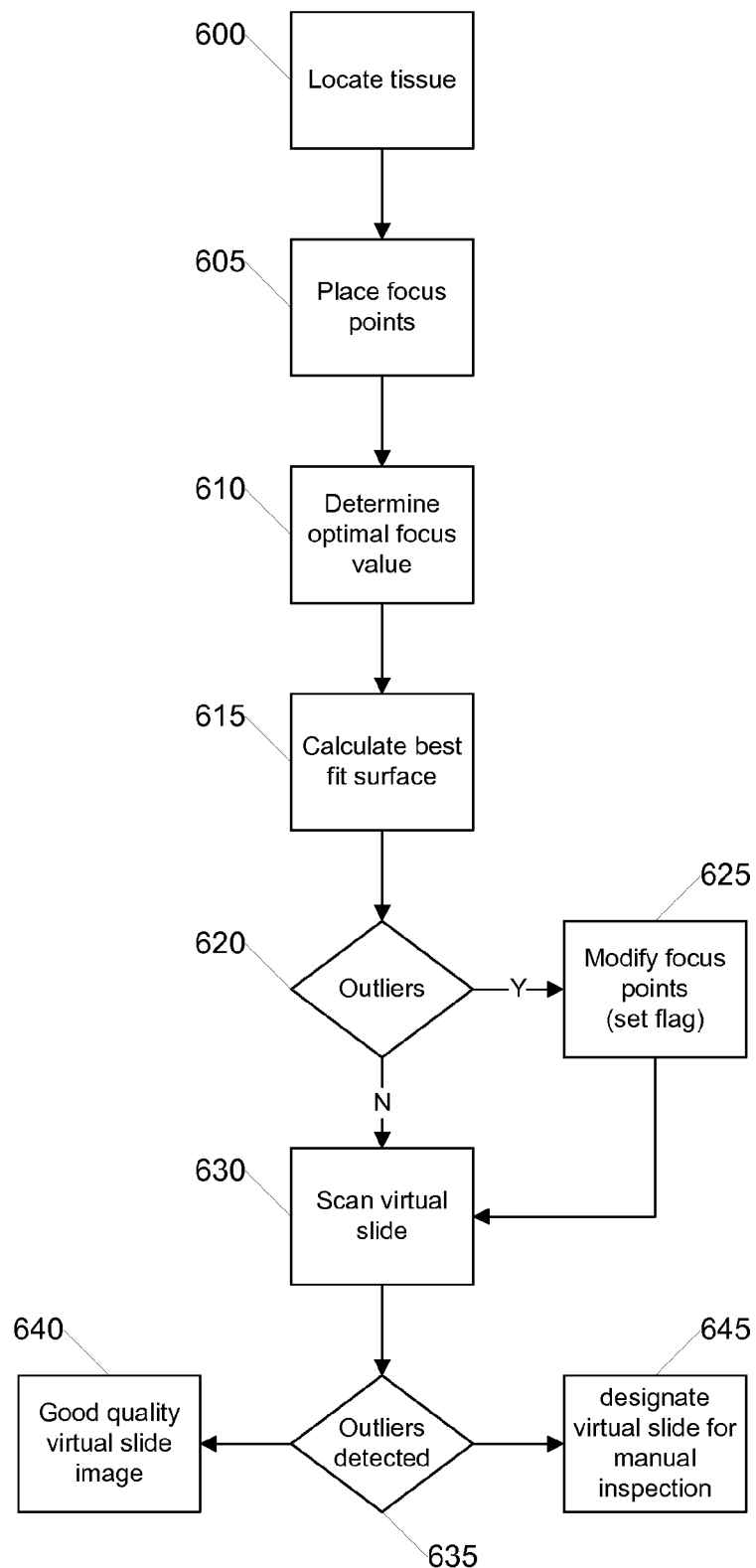
FIG. 6 is a flow diagram illustrating an example process for image quality assessment during the scanning of a microscope slide or a portion thereof according to an embodiment of the present invention.

FIG. 6 is a flow diagram illustrating an example process for image quality assessment during the scanning of a microscope slide or a portion thereof according to an embodiment of the present invention. The illustrated real time assessment process can be used in place of a post scan image assessment process, or even in combination with a post scan image assessment process in order to improve image quality and reduce the number of virtual slide images that are manually inspected. One advantage of the real time assessment process is that focus points that are identified as outliers can be eliminated from the focal surface. Since these outlier focus points are a primary cause of poor focus quality, eliminating them before they are used will improve the percentage of good quality images that are produced by the scanner. Additionally, the pre-scan focus procedure may be augmented by the outlier detection procedure, for example to allow the scanning system to identify new focus points near any eliminated focus points that were identified as outliers.

Initially, in step 600 the process begins with locating the tissue sample on the microscope slide and then placing focus points at various locations on the tissue sample, as shown in step 605. Next, in step 610 the scanning system obtains the focus value for the various focus points and then in step 615 the best fit surface is calculated. At this point the outlier detection procedure is employed in step 620 to determine if any of the focus points are outliers. If there are outliers, these focus points are modified in step 625, for example by eliminating them from the set of focus points or by changing the location slightly and then recapturing the focus value for the new location of the focus point. For example, moving the focus point slightly might eliminate a pen mark or other marking that caused the focus value to be incorrectly read.

Additionally, in step 625 a flag can optionally be set that indicates that an outlier was initially detected. This may advantageously allow the virtual slide image to be flagged as needing a manual inspection in order to improve the overall quality of captured virtual slide images. Alternatively, no flag may be set when an outlier focus point is eliminated and replaced with a focus point that is not an outlier. Advantageously, replacing an outlier focus point with a non-outlier focus point may reduce the total number of virtual slide images that need manual inspection.

After the outlier focus points are modified, or if there were no outlier focus points, in step 630 the virtual slide is scanned. It is important to note at this point that in alternative embodiments, the steps 605-630 may be taken repeatedly for each individual stripe that is captured as part of a virtual slide image capture process (interleaved) or the steps may be taken once in advance of the entire virtual slide image capture process.

After the scanning process is complete, if the optional outlier flag has been set, as determined in step 635, the virtual slide image may be designated for manual inspection as shown in step 645. Alternatively, the presence of the outlier flag may just be recognized for statistical tracking of the scanning system. If no outliers were detected, as determined in step 635, or alternatively if a flag was set but only for statistical tracking purposes, then the virtual slide image is classified as having good quality, as shown in step 640.

One benefit of designating for manual inspection those virtual slide images that had modified or eliminated focus points is the improved quality control. Advantageously, the resulting virtual slide image has a higher likelihood of being of good quality upon inspection, even if outliers were initially detected, since the outlier points were not used or were modified such that the modified focus points were not outliers. This means that although manual inspection is still performed, a re-scan is less likely to be necessary, thereby providing an additional time savings with improved quality control.

Figure 7:
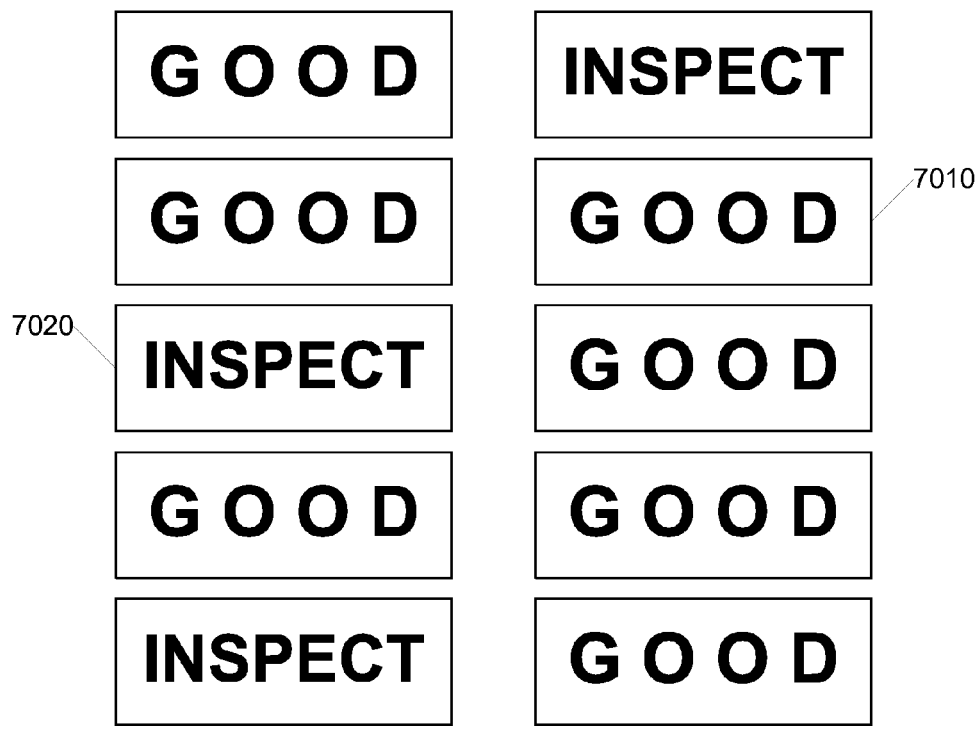
FIG. 7 is a block diagram illustrating an example display presentation for streamlining the manual inspection process according to an embodiment of the present invention.

FIG. 7 is a block diagram illustrating an example display presentation for streamlining the manual inspection process according to an embodiment of the present invention. In the illustrated embodiment a set of 10 virtual slide images that have been captured are presented to an operator, for example on the display screen of a computer device. In one embodiment the display screen may be the console of the scanning device. To assist the operator of the scanner, a visual representation of the image quality results can be shown. For example, in the illustrated embodiment, a series of rectangles representing slides that have been scanned is shown with inscribed text that identifies virtual slide images that need manual inspection. Alternatively graphical or color code indicators may also be employed.

For those virtual slide images that are classified as good images such as virtual slide image 7010, the operator does not need to conduct a manual inspection. For those virtual slide images that are flagged as needing a manual inspection, such as virtual slide image 7020, the operator may efficiently conduct a manual inspection by, for example, clicking on the rectangle that represents the suspect virtual slide image. Advantageously, this may cause a viewing application to be executed that results in the actual virtual slide image being displayed on the same display screen.

In one embodiment, the coordinates of the outlier focus point may be captured when the outlier is detected and then when the suspect virtual slide image is displayed to an operator for manual inspection, the specific area that is suspect may be initially presented to the operator to further streamline the inspection process. Alternatively, a region surrounding the identified outlier focus point may be outlined with an overlay on the virtual slide image or otherwise highlighted or identified to facilitate rapid manual inspection of the virtual slide image. Of course, the operator will also be able to pan and zoom the entire virtual slide image to inspect the quality and determine whether the image quality is good, or whether the slide needs to be re-scanned.

Advantageously, the operator only needs to manually inspect those virtual slide images that are identified as needing a manual inspection. The operator can easily tell at a glance whether there are any images to inspect and go directly to those images for visual inspection. This saves the operator time and makes the entire process more efficient, by quickly recognizing whether any images require further inspection. Furthermore, the graphical display may also provide the operator with easy access to a re-scan mode so that the re-scanning process is also streamlined.

Figure 8:
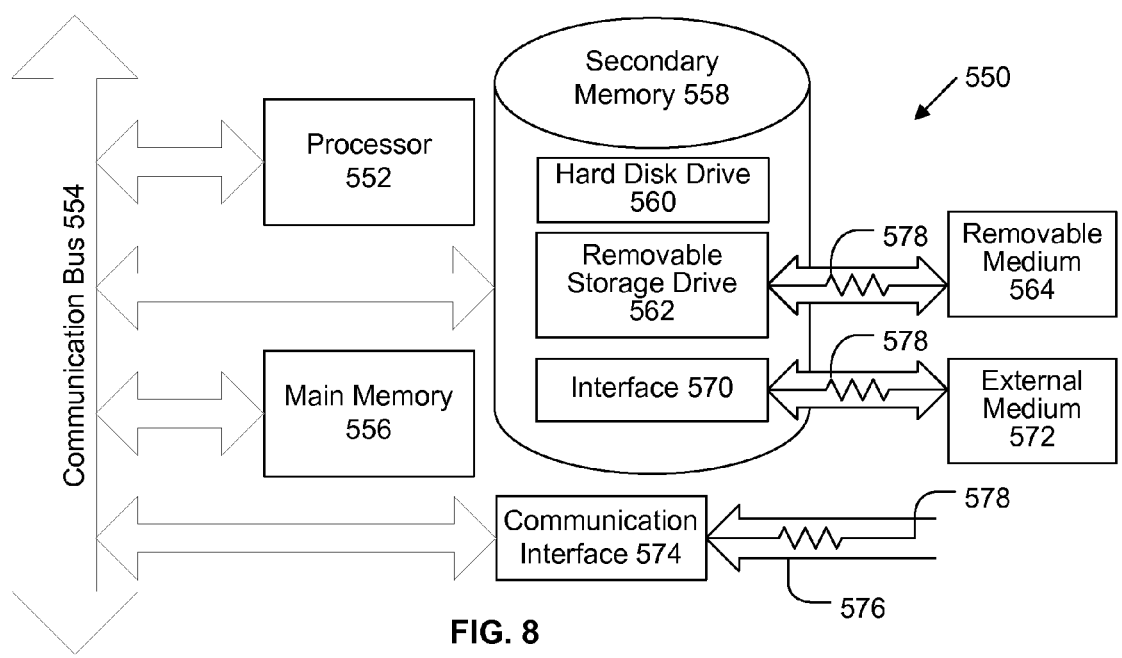

FIG. 8 is a block diagram illustrating an exemplary computer system 550 that may be used in connection with the various embodiments described herein. For example, the computer system 550 may be used in conjunction with an image capture device, image processor device, or an image server device, just to name a few. Other computer systems and/or architectures may also be used, as will be clear to those skilled in the art.

The computer system 550 preferably includes one or more processors, such as processor 552. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 552.

The processor 552 is preferably connected to a communication bus 554. The communication bus 554 may include a data channel for facilitating information transfer between storage and other peripheral components of the computer system 550. The communication bus 554 further may provide a set of signals used for communication with the processor 552, including a data bus, address bus, and control bus (not shown). The communication bus 554 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

Computer system 550 preferably includes a main memory 556 and may also include a secondary memory 558. The main memory 556 provides storage of instructions and data for programs executing on the processor 552. The main memory 556 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 558 may optionally include a hard disk drive 560 and/or a removable storage drive 562, for example a floppy disk drive, a magnetic tape drive, a compact disc ("CD") drive, a digital versatile disc ("DVD") drive, etc. The removable storage drive 562 reads from and/or writes to a removable storage medium 564 in a well-known manner. Removable storage medium 564 may be, for example, a floppy disk, magnetic tape, CD, DVD, etc.

The removable storage medium 564 is preferably a computer readable medium having stored thereon computer executable code (i.e., software) and/or data. The computer software or data stored on the removable storage medium 564 is read into the computer system 550 as electrical communication signals 578.

In alternative embodiments, secondary memory 558 may include other similar means for allowing computer programs or other data or instructions to be loaded into the computer system 550. Such means may include, for example, an external storage medium 572 and an interface 570. Examples of external storage medium 572 may include an external hard disk drive or an external optical drive, or and external magneto-optical drive.

Other examples of secondary memory 558 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage units 572 and interfaces 570, which allow software and data to be transferred from the removable storage unit 572 to the computer system 550.

Computer system 550 may also include a communication interface 574. The communication interface 574 allows software and data to be transferred between computer system 550 and external devices (e.g. printers), networks, or information sources. For example, computer software or executable code may be transferred to computer system 550 from a network server via communication interface 574. Examples of communication interface 574 include a modem, a network interface card ("NIC"), a communications port, a PCMCIA slot and card, an infrared interface, and an IEEE 1394 fire-wire, just to name a few.

Communication interface 574 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 574 are generally in the form of electrical communication signals 578. These signals 578 are preferably provided to communication interface 574 via a communication channel 576. Communication channel 576 carries signals 578 and can be implemented using a variety of wired or wireless communication means including wire or cable, fiber optics, conventional phone line, cellular phone link, wireless data communication link, radio frequency (RF) link, or infrared link, just to name a few.

Computer executable code (i.e., computer programs or software) is stored in the main memory 556 and/or the secondary memory 558. Computer programs can also be received via communication interface 574 and stored in the main memory 556 and/or the secondary memory 558. Such computer programs, when executed, enable the computer system 550 to perform the various functions of the present invention as previously described.

In this description, the term "computer readable medium" is used to refer to any media used to provide computer executable code (e.g., software and computer programs) to the computer system 550. Examples of these media include main memory 556, secondary memory 558 (including hard disk drive 560, removable storage medium 564, and external storage medium 572), and any peripheral device communicatively coupled with communication interface 574 (including a network information server or other network device). These computer readable mediums are means for providing executable code, programming instructions, and software to the computer system 550.

In an embodiment that is implemented using software, the software may be stored on a computer readable medium and loaded into computer system 550 by way of removable storage drive 562, interface 570, or communication interface 574. In such an embodiment, the software is loaded into the computer system 550 in the form of electrical communication signals 578. The software, when executed by the processor 552, preferably causes the processor 552 to perform the inventive features and functions previously described herein.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

The invention claimed is:

1. A computer implemented method for real-time image quality optimization of a virtual microscope slide image, comprising:
   identifying a set of focus points corresponding to a tissue sample on a microscope slide;
   calculating a best fit surface from the set of focus points;
   determining a distance of each focus point from the best fit surface;
   identifying a maximum distance of each focus point from the best fit surface;
   comparing the identified maximum distance of each focus point from the best fit surface to a predetermined threshold distance to identify one or more outlier focus points in the set of focus points;
   recalibrating at least one of the outlier focus points in the set of focus points, wherein recalibrating comprises changing the location, instead of eliminating, of an outlier focus point and recapturing the focus point at the changed location;
   determining a focal surface in accordance with the set of focus points, including the at least one recalibrated outlier focus point; and
   scanning the tissue sample on the microscope slide in accordance with the focal surface.

2. The method of claim 1, further comprising setting a flag if the identified one or more outlier focus points exceed a predetermined number.

3. The method of claim 1, further comprising removing an outlier focus point from the set of focus points.

4. The method of claim 1, wherein the best fit surface is calculated for the entire microscope slide.

5. The method of claim 1, wherein the best fit surface is calculated per scan stripe.

6. A computer implemented system for optimizing the image quality of a virtual microscope slide image in real-time, comprising:
- a microscope slide scanning system configured to scan a specimen on a microscope slide to create a virtual microscope slide image;
- a memory configured to store the scanned virtual microscope slide image;
- the microscope slide scanning system comprising:
  - a focus point identifier module configured to identify a set of focus points corresponding to a tissue sample on the microscope slide;
  - a best fit surface module configured to calculate a best fit surface from the set of focus points;
  - a distance module configured to identify a maximum distance of each focus point from the best fit surface;
  - a comparison module configured to compare the maximum distance of each focus point from the best fit surface to a predetermined threshold distance to identify one or more outlier focus points in the set of focus points;
  - an adjustment module configured to recalibrate at least one of the outlier focus points in the set of focus points wherein recalibrating comprises changing the location, instead of eliminating, of an outlier focus point and recapturing the focus point at the changed location;
  - a focal surface module configured to generate a focal surface in accordance with the set of focus points, including the at least one recalibrated outlier focus point;
  - a scanning module configured to scan the tissue sample on the microscope slide in accordance with the focal surface.

7. The system method of claim 6, wherein the comparison module sets a flag if the identified one or more outlier focus points exceeds a predetermined number.

8. The system of claim 6, wherein the adjustment module further removes an outlier focus point from the set of focus points.

9. The system of claim 6, wherein the best fit surface module calculates the best fit surface for the entire microscope slide.

10. The system of claim 6, wherein the best fit surface is calculated per stripe.

* * * * *